United States Patent [19]

Maslin et al.

[11] 4,287,377

[45] Sep. 1, 1981

[54] HYDROCARBON CONVERSION

[75] Inventors: Raymond Maslin, Acklam; Bodo Linnhoff, Hoole, both of England

[73] Assignee: Imperial Chemical Industries Limited, London, England

[21] Appl. No.: 60,126

[22] Filed: Jul. 24, 1979

[30] Foreign Application Priority Data

Aug. 7, 1978 [GB] United Kingdom ............... 32468/78

[51] Int. Cl.$^3$ .......................... C07C 2/00; C07C 5/00
[52] U.S. Cl. .................................... 585/634; 422/129; 585/503; 585/648; 585/752; 585/910; 585/911; 585/914
[58] Field of Search ............... 585/634, 503, 635, 648, 585/752, 910, 911, 914

[56] References Cited

U.S. PATENT DOCUMENTS

| | | | |
|---|---|---|---|
| 2,216,471 | 10/1940 | Frame et al. | 208/132 |
| 3,012,082 | 12/1961 | Kelly, Jr. et al. | 585/910 |
| 3,087,898 | 4/1963 | Pfeiffer et al. | 585/910 |
| 4,143,521 | 3/1979 | Pano et al. | 585/634 |

*Primary Examiner*—Curtis R. Davis
*Attorney, Agent, or Firm*—Cushman, Darby & Cushman

[57] ABSTRACT

Process and apparatus for a hydrocarbon conversion process, for example thermal cracking, in which feedstock is converted in a heated furnace, the furnace being heated by burning a mixture of fuel and preheated air. The preheated air is obtained by passing air through successive compression, heating and gas turbine expansion zones, the work thereby obtained from the gas turbine expansion zone being used, at least in part, to compress hydrocarbon process gas produced in the furnace.

8 Claims, 1 Drawing Figure

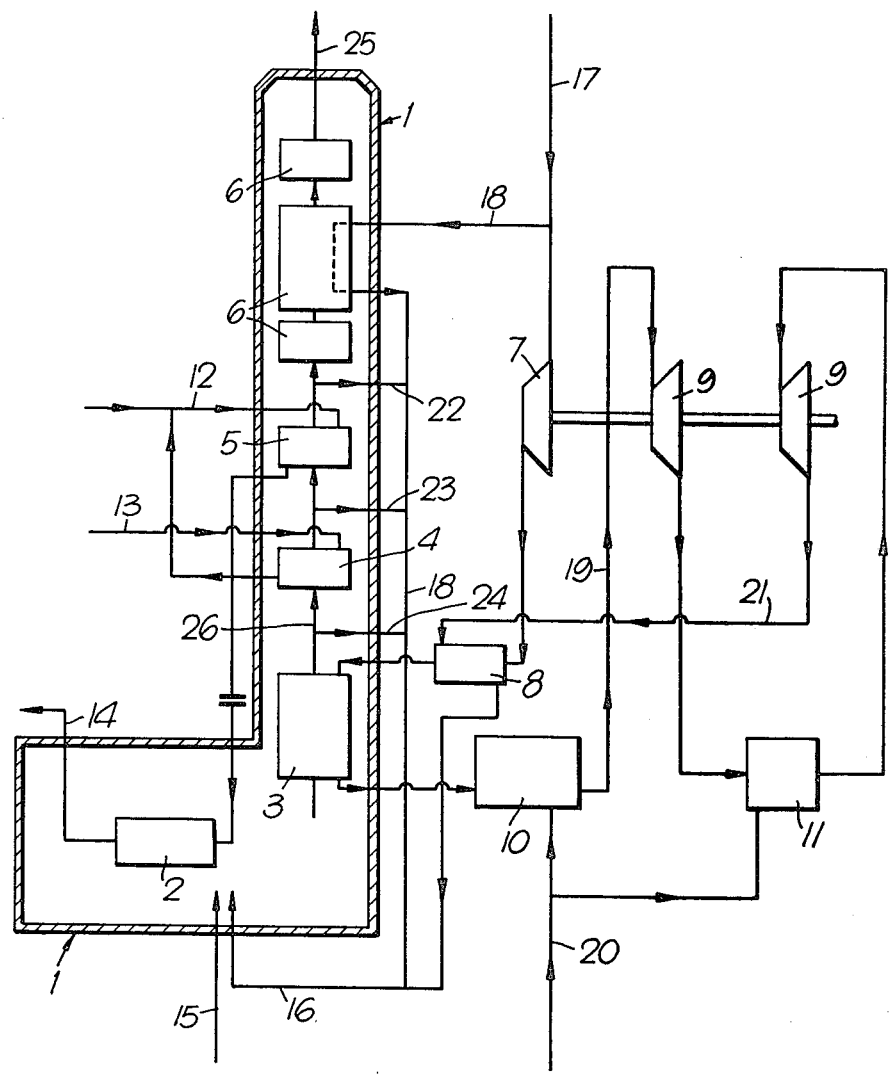

HYDROCARBON CONVERSION

The present invention relates to a process and apparatus for effecting hydrocarbon conversion in a hydrocarbon conversion furnace. It is believed that the invention will have applicability in a number of processes for hydrocarbon conversion, for example the thermal and catalytic cracking of crude oil, naphtha and other feedstocks, the pyrolysis of methane to yield acetylene, but the invention is particularly exemplified by its application in the thermal cracking of feedstocks such as crude oil, gas oil and naphtha. For ease of description therefore the invention is hereinafter described with reference to thermal cracking but it is to be understood that this reaction is only one of several, as hereinbefore mentioned, to which our invention is applicable.

Thermal cracking of hydrocarbon feedstocks is widely practised. A large proportion of such cracking is directed to the production of ethylene as the primary pyrolysis product and many plants each producing more than 200,000 tons per year of ethylene are now in operation.

Processes at present in operation for thermal cracking of hydrocarbon feedstocks almost invariably effect cracking in radiantly heated elongated pyrolysis coils through which a process stream comprising the hydrocarbon feedstock and steam diluent is passed. The pyrolysis coils are each housed in a furnace box and each plant may contain many of these furnaces, for example as many as twenty-five in a plant producing 500,000 tons of ethylene per year. The radiant heat flux to the pyrolysis coils is derived from numerous burners housed in the furnace boxes.

The hydrocarbon process gas obtained by pyrolysis of the hydrocarbon feedstock contains many compounds in varying concentration, depending upon the feedstock, and it is therefore necessary to separate the various compounds from one another. Processes commonly used for this purpose employ a combination of high pressure and low temperature in a manner designed generally to minimise thermodynamic irreversibilities and to thereby lower operating and investment charges. The hydrocarbon process gas is therefore usually compressed from a pressure close to atmospheric to a pressure of the order of 30 atmospheres. The compression usually takes place in a number of stages with intercooling and liquid recovery between stages. The hydrocarbon process stream is then passed through a number of distillation towers which, in turn, remove components such as methane, ethane, and propane. Before being fed to these distillation towers, the compressed process gas stream is chilled by propylene and/or ethylene refrigeration.

Thus in operating a plant for hydrocarbon conversion, for example a thermal cracking plant, large quantities of energy are consumed. Plant designers and operators have made considerable steps in reducing energy consumption in such plants, for example by judicious use of recycling and heat exchange but there is still a need to further reduce energy consumption if at all possible. The Applicants have made a detailed study of an olefin thermal cracking plant from a viewpoint based on the second Law of Thermodynamics i.e. by a consideration of the irreversibilities of the cracker and have found that further reductions in energy consumption are possible.

According to the present invention a process for hydrocarbon conversion comprises converting a hydrocarbon feedstock in a heated furnace to produce hydrocarbon process gas wherein the furnace is heated by burning a mixture of fuel and preheated air, the preheated air having been obtained by passing air through successive compression, heating and gas turbine expansion zones, the work thereby obtained from the gas turbine expansion zone being use, at least in part, to compress hydrocarbon process gas produced in the furnace. Preferably, the air used is air initially at ambient conditions.

The furnace is suitably any furnace used for conversion, especially cracking, of a hydrocarbon feedstock, for example a radiantly heated thermal cracking furnace containing pyrolysis tubes or coils.

Preheated air is conveniently obtained by first compressing relatively cool air, most suitably air at ambient temperature in a compression zone, for example an axial flow compressor. The air is suitably compressed to as high a pressure as is necessary and practical. Thereafter, the compressed air is heated in at least one heating zone selected from a conventional gas turbine recuperator, a furnace/turbine heat exchanger, that is, a heat exchanger which transfers heat from flue gases in the bottom portion of the furnace stack to the compressed air at a point between the compression zone and the turbine expansion zone, and a conventional gas turbine combustor. Optionally, the air is heated in two or more such heating zones. The size and choice of the units used in the heating zones can be optimised to take account of the relative costs of light and heavy fuels and utility steam as well as of equipment design considerations, for example pressure drop in heat exchangers, connections to standard gas turbines, wall temperature gradients, safety requirements.

Following its compression and heating, the air is expanded in a gas turbine expansion zone which preferably comprises a multi-stage gas turbine in which case provision for applying reheat to the air is optionally provided between stages by further firing units. The work obtained from the gas turbine expansion zone is preferably used in other parts of the hydrocarbon conversion plant, some at least being used to provide shaft work, either by direct coupling or by indirect coupling for example through electric generation, for compression of the hydrocarbon process gas and for refrigeration purposes, for example of ethylene and propylene on a thermal cracking plant.

The provision of a gas turbine expansion zone enables steam turbines, which have been used hitherto to provide power, to be replaced, at least partially, with possible associated savings in capital (for example by a reduction in condensing steam cooling water capacity) and operating costs. However, the process of this invention also embraces the use of steam turbines and gas turbines together in the same plant.

From the gas turbine expansion zone, the expanded air is fed into the pyrolysis furnace for combustion with fuel to provide the temperatures required for hydrocarbon conversion. The provision of preheated air enables heavier fuel to be used than would otherwise be the case thus widening the range of suitable fuels. Optionally, the compressed, heated and expanded air which is fed to the furnace is supplemented with preheated fresh air which has not undergone compression and subsequent expansion. Such supplemental air may be heated in a separate heater or by other means, for example by heat exchange, for example with flue gases from the hydrocarbon process, for example cracking furnace stack gases. Optionally, also, the compressed, heated and expanded air which is fed to the furnace is supplemented with recycled fuel gases from the furnace.

In processes according to this invention in which several furnaces are employed, the ratio of number of gas turbines employed to the number of furnaces used is not restricted since transfer of gas and heat between furnaces and turbines is readily achievable by manifolding arrangements. Thus any ratio can be employed which will optimise costs and operating arrangements.

The present invention also comprises apparatus for effecting hydrocarbon conversion and comprising in association a heated furnace in which hydrocarbon feedstock is converted to hydrocarbon process gas and which is heated by burning a mixture of fuel and preheated air, compression means, heating means and gas turbine expansion means for heating relatively cool air to form preheated air for supply to said furnace, and compression means to compress said hydrocarbon process gas and powered, at least in part, by shaft work provided by said gas turbine expansion means. Optionally, compression means to compress refrigeration gases used in the hydrocarbon conversion process is also powered, at least in part, by shaft work provided by the gas turbine expansion means.

Preferably the compression means comprises an axial flow compressor. Preferably, the heating means comprises a gas turbine recuperator, a furnace/turbine heat exchanger, or a gas turbine combustor. The gas turbine expansion means preferably comprises a multi-stage gas turbine, optionally provided between stages with extra firing units to apply reheat to the air.

One embodiment of the invention is hereinafter described with reference to the accompanying drawing which is a schematic flow diagram of part of a hydrocarbon thermal cracking process for the production of olefins. The direction of flow of various liquid and gas streams is indicated by arrows.

Referring to the drawing, a structure 1 is shown representing the part of the plant housing the pyrolysis furnaces 2 (of which, for clarity, only one is shown), a furnace/turbine heat exchanger 3, a dilution steam super-heater 4, a heat exchanger 5, and a further heat exchange system 6. Heat for heat exchanger 3, for super-heater 4 and heat exchangers 5 and 6 is supplied along line 26 by flue gases from the furnace 2.

A system for preheating air which is to be mixed with fuel for heating the furnace 2 includes a compressor 7, a gas turbine recuperator 8, furnace/turbine heat exchanger 3, a gas turbine 9 (shown, for example only, with two stages) and firing units 10, 11, together with an optional auxiliary system, described hereinafter in more detail, which is linked through line 18.

In operation, hydrocarbon feedstock, for example naphtha, to be cracked is preheated by passage along line 12 through heat exchanger 5 and thence to furnace 2. Dilution steam for mixing with the hydrocarbon feedstock is fed along line 13 into super-heater 4 and thence is combined with the feedstock in line 12 for passage through heat exchanger 5 to the furnace. The products of the cracking process are removed from the furnace for further processing along line 14.

The furnace 2 is heated by combustion of fuel oil supplied along line 15 and mixed for combustion purposes with preheated air supplied along line 16. Preheating of the air is effected by feeding ambient air along line 17 to compressor 7. If desired, a portion of the air can be diverted along line 18 for partial preheating in heat exchange system 6. Following compression, the air is heated in gas turbine recuperator 8, furnace/turbine heat exchanger 3 and firing unit 10. In this embodiment, the air is heated in all three of these units but, if desired, in other embodiments one or two of them can be omitted depending on the particular operating needs of the process. The compressed and heated air is then fed along line 19 for expansion in gas turbine stages 9 and interstage reheating, if necessary, in firing unit 11. Fuel for firing units 10 and 11 is supplied along line 20. The expanded air stream is then fed along line 21 through gas turbine recuperator 8 and thence by line 16 to the furnace 2. The air stream in line 21 may be supplemented by the by-passed fresh air from line 18 hereinbefore mentioned and/or by recycled flue gases fed along lines 22, 23 and 24. Unused flue gases exit by line 25. Shaft work obtained from the gas turbine 9 is used in one or more compressors, for example compressor 7, and to compress the hydrocarbons exiting along line 14 from the furnace 2, and also to compress refrigeration gases used in other parts of the plant (not shown).

A modification to the process hereinbefore described involving a suitable margin of over-design of firing units 10 and 11 enables the gas turbine 9 to be started up independently of the cracking furnaces. Such a modification could simplify/speed-up the start-up procedure for the cracking furnaces themselves.

The process and apparatus of the present invention allow useful savings to be made in fuel consumption in a hydrocarbon conversion process by efficient use of turbine exhaust gas which can be used in its own right in the process e.g. in a pyrolysis furnace. It is also likely that there will be capital cost savings by the replacement of at least some of the steam turbines, especially condensers/cooling water capacity and associated equipment used in conventional plants by gas turbines. The process and apparatus of the invention also allow considerable flexibility in design and operating conditions.

We claim:

1. A process for hydrocarbon conversion which comprises converting a hydrocarbon feedstock in a heated furnace to produce hydrocarbon process gas wherein the furnace is heated by burning a mixture of fuel and preheated air, the preheated air having been obtained by passing air through successive compression, heating and gas turbine expansion zones, the work thereby obtained from the gas turbine expansion zone being used, at least in part, to compress hydrocarbon process gas produced in the furnace.

2. A process as claimed in claim 1 in which the air used is air initially at ambient conditions.

3. A process as claimed in claim 1 in which work obtained from the gas turbine expansion zone is used in other parts of the hydrocarbon conversion process.

4. A process as claimed in claim 3 in which the work obtained from the gas turbine expansion zone is used for compressor or refrigeration purposes.

5. A process as claimed in claim 1 in which the compressed, heated and expanded air fed to the furnace is supplemented with preheated fresh air.

6. A process as claimed in claim 5 in which the supplemental air is preheated by heat exchange with flue gases from the furnace.

7. A process as claimed in claim 1 in which the compressed, heated and expanded air fed to the furnace is supplemented with recycled flue gases from the furnace.

8. A process as claimed in claim 1 in which the hydrocarbon conversion comprises thermal cracking of a hydrocarbon feedstock to produce olefins.

* * * * *